(12) United States Patent
Wickramasinghe et al.

(10) Patent No.: US 10,843,148 B2
(45) Date of Patent: Nov. 24, 2020

(54) INTEGRATED ELECTROWETTING NANO-INJECTOR AND ASPIRATOR

(71) Applicant: The Regents of the University of California, Oakland, CA (US)

(72) Inventors: Hemantha K. Wickramasinghe, Irvine, CA (US); Elaheh Shekaramiz, Rancho Santa Margarita, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 16/012,002

(22) Filed: Jun. 19, 2018

(65) Prior Publication Data
US 2018/0369768 A1   Dec. 27, 2018

Related U.S. Application Data

(60) Provisional application No. 62/524,374, filed on Jun. 23, 2017.

(51) Int. Cl.
| | | |
|---|---|---|
| *B01F 13/00* | (2006.01) | |
| *B01L 3/00* | (2006.01) | |
| *B01L 3/02* | (2006.01) | |
| *G01N 35/10* | (2006.01) | |

(52) U.S. Cl.
CPC .......... *B01F 13/0076* (2013.01); *B01L 3/022* (2013.01); *B01L 3/0255* (2013.01); *B01L 3/502792* (2013.01); *G01N 35/10* (2013.01); *B01L 2300/0645* (2013.01); *B01L 2300/0896* (2013.01); *B01L 2400/0427* (2013.01); *G01N 2035/1034* (2013.01)

(58) Field of Classification Search
CPC .. C07D 471/18; C07D 471/22; C07D 491/18; C07D 491/22; C07D 497/22; B01F 13/0076; B01L 2300/0645; B01L 2300/0896; B01L 2400/0427; B01L 3/022; B01L 3/0255; B01L 3/502792; F24D 12/02; F24D 3/1066; G01N 2035/1034; G01N 35/10; Y02B 30/14
USPC ........................................... 435/173.1, 283.1
See application file for complete search history.

(56) References Cited

U.S. PATENT DOCUMENTS

| | | | | |
|---|---|---|---|---|
| 9,862,941 B2* | 1/2018 | Lee | ........................ | C12Q 1/6806 |
| 2017/0107507 A1* | 4/2017 | Lee | .......................... | C40B 40/08 |

OTHER PUBLICATIONS

Cote et al. Annals of Biomedical Engineering, vol. 15, pp. 419-426, 1987 (Year: 1987).*
Li et al. Lab Chip, 2017, 17, 1635, Apr. 3, 2017. (Year: 2017).*
Shekaranniz et al. Scientific Reports, 6:29051, Jul. 2016. (Year: 2016).*
Shekaramiz et al. Integrated Electrowetting Nanoinjector for Single Cell Transfection. Scientific Reports | 6:29051 | DOI: 10.1038/srep29061. Jul. 2016.
Laforge et al. Electrochemical attosyringe. PNAS, Jul. 17, 2007, vol. 104, No. 29, pp. 11895-11900.

* cited by examiner

*Primary Examiner* — Janet L Epps-Smith
(74) *Attorney, Agent, or Firm* — Nguyen Tarbet

(57) ABSTRACT

A new simple transfection method using an integrated electrowetting nano-injector ("INENI") with controlled dosage delivery and high transfection efficiency is disclosed. The volume of delivery can be controlled via voltage application to an inner and outer electrode integrated into a nano-pipette. With higher voltages, more liquid enters the INENI and with lower voltages liquid is expelled. This method can be used to deliver plasmid DNA directly into the nuclei of cells. The INENI requires only the use of a single probe since both electrodes are integrated into the same nano-pipette. Hence, more space is available, and ergo the INENI offers a simplistic means for direct injection of metered amounts of exogenous material into the confines of a cell cytoplasm and/or nucleus while retaining full cell viability.

10 Claims, 8 Drawing Sheets

Injected cell #1       Injected cell #2

INTEGRATED ELECTROWETTING NANO-INJECTOR AND ASPIRATOR

CROSS REFERENCE

This application claims priority to U.S. Provisional Application No. 62/524,374, filed Jun. 23, 2017, the specification(s) of which is/are incorporated herein in their entirety by reference.

FIELD OF THE INVENTION

The present invention relates to the injection or aspiration of biomaterials, more specifically, the use of electrowetting to induce the movement of biomaterial into and out of a living cell.

BACKGROUND OF THE INVENTION

The need for techniques to deliver DNA and other macromolecules into cells has been steadily increasing since the advent of gene therapy applications. Many techniques have been introduced and evolved in recent decades for this purpose both at the bulk cell level as well as the single cell level. The most common transfection techniques at the bulk cell level are viral and chemical transfections. Although viral transfection has high transfection efficiency, it is very expensive and can cause inflammatory responses. Chemical transfection techniques on the other hand have low transfection efficiency. Both viral and chemical techniques lack control of dosage and cannot deliver genes to cells individually. Single cell transfection techniques have limited transfection efficiency, dosage control, cell viability, and ease of fabrication. For instance, microinjection, which is the most common transfection technique, damages cells due to the large micro-injector needle diameters of 0.5-5 μm and the needles tend to clog before injection.

Other single cell transfection techniques such as optoporation lack controlled dosage delivery and need optimization of parameters for each cell type. Single cell electroporation techniques have low cell viability given the high electric fields applied to each cell. Grandbois et al. transfected cells by inserting plasmid-decorated Atomic Force Microscopy ("AFM") probes and incubating them in cells for one minute. The number of molecules injected was not quantified and the efficiency was 30%. Recently, Vorholt et al. injected plasmids into single cells using specialized AFM tips fabricated with integrated fluidics. However, the fabrication of such AFM tips is cumbersome and they possess a reported efficiency of 40%. Most importantly, injection volumes could only be determined after injection, with the help of a co-injected fluorescent marker. Pourmand's group used double-barrel nano-pipettes to inject fluorescent dyes inside human BJ broblast cells. Mirkin, et al. also developed a method where one electrode was placed inside culture media and another inside the nano-pipette and used it to deliver positively and negatively charged fluorescent dyes into cells. However, neither techniques were used to change the genetic expression of living cells.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a method of using electrowetting to stimulate an injection or an aspiration of a biomaterial out of or into a nano-pipette having an aperture with dimensions in the nanoscale region. In some embodiments, the biomaterial is an aqueous solution comprising an organic phase and an aqueous phase. In other embodiments, the method comprises: coupling an outer electrode to the outer surface of the nano-pipette; inserting an inner electrode into the aqueous solution within the nano-pipette; and applying a potential difference between the outer electrode and the inner electrode to electrically change the wetting angle between the organic phase and the aqueous solution. A wetting angle is a contact angle that a liquid creates with a solid surface or capillary walls of a porous material when both materials come in contact together. This angle is determined by both properties of the solid and the liquid and the interaction and repulsion forces between liquid and solid and by the three phase interface properties (gas, liquid and solid). Those interactions (wettability) are described by cohesion and adhesion forces which are intermolecular forces.

In some embodiments, the change in the wetting angle effectively stimulates the movement of the aqueous solution. Specifically, the aqueous solution is extracted and drawn into the nano-pipette when the potential difference exceeds a threshold voltage; the aqueous solution is injected and drawn out of the nano-pipette when the potential difference is lower than the threshold voltage. Further, the volume of the aqueous solution extracted or injected is dependent on the magnitude of the potential difference applied. In an embodiment, the volume of the aqueous solution has a range of 1 femto-liter to tens of femto-liters.

Prior technology employs cellular injections for electrochemical control of the fluid motion that allows sampling and dispensing femtoliter-range volumes of either aqueous or non aqueous solutions using a nano-pipette. As shown in FIG. 1D, the cellular injection produces a sufficient force to draw solution inside the nano-pipette and then inject it into an immobilized biological cell, by changing the potential applied across the liquid/liquid interface. In this prior art, one reference electrode is inserted in the pipette and another reference electrode is separately immersed in the outer solution.

Prior technology creates an enlarged field between the organic phase and the aqueous solution on applying potential across a membrane as the outer electrode is detached from the pipette. This adversely affects the control on surface tension which is largely responsible for the fluid motion at the interface (e.g. liquid/liquid, water/glass, organic solvent/glass and a three phase water/organic solvent/glass interface). The large field produced due to applied potential increases the ion-transfer current which in turn undesirably increases the movement of charged molecules in the aqueous solution.

The present invention overcomes this deficiency by co-localizing the outer electrode and the inner electrode and integrating the outer electrode on the pipette. The use of integrated electrowetting surprisingly provides for significantly better movement of biomaterial for aspirating (or injecting) said material into (or out of) a living cell using a nano-pipette. In some embodiments, as shown in FIG. 1B, the integration of the outer electrode on the pipette creates local field between the organic phase and the aqueous solution which eases extraction of high viscous biomaterial inside the living cell. Further, the integrated electrowetting of the present invention surprisingly provides direct transfection or extraction from within the nucleus of the living cell with improved wettability. One such example is the extraction of protein from the living cell and tracking the protein expression in response to an external stimuli such as drugs or cell signaling molecules using the present invention.

In some embodiment, the integration of the outer electrode on the pipette is achieved by using a thermal evaporation process on a one side of a surface of the nano-pipette and a remainder of the surface of the nano-pipette is blocked using Trypticase soy agar (TSA) without closing the aperture.

Without wishing to limit the invention to any theory or mechanism, it is believed that the technical feature of the present invention advantageously performs the aspiration (or injection) for pipette apertures having dimensions in the nano-scale region without causing damage to the living cells from which the biomaterial is extracted (or injected). None of the presently known prior references or work has the unique inventive technical feature of the present invention embodiment. Another current technology applies gas pressure to push biomaterials out of pipettes having apertures in the micron range. As pipette apertures decrease to nanoscale dimensions, the pressure required to eject biomaterial becomes prohibitively high. Further, current technologies have shown that injection into living cells using 0.5 micron pipettes cause damage to the living cell.

BRIEF DESCRIPTION OF THE DRAWINGS

The features and advantages of the present invention will become apparent from a consideration of the following detailed description presented in connection with the accompanying drawings in which.

DETAILED DESCRIPTION OF THE INVENTION

Figure 1A:
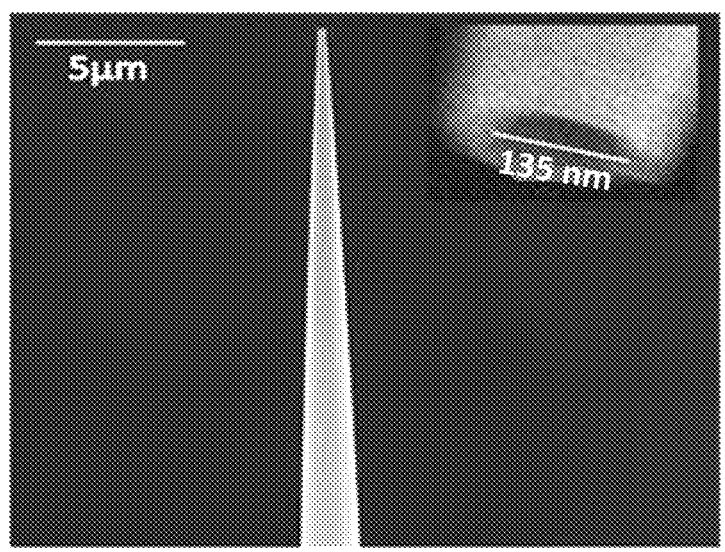
FIG. 1A shows a scanning electron microscopy image of the integrated electrowetting nano-injector and aspirator ("INENI") of the present invention.

Referring now to FIGS. 1A-5D the present invention features a method of using electrowetting to stimulate an injection or an aspiration of a biomaterial out of or into a nano-pipette (102) having an aperture with dimensions in the nanoscale region. In some embodiments, the biomaterial is an aqueous solution (104) comprising an organic phase and an aqueous phase, where execution of said electrowetting comprises changing a wetting angle at an interface between the organic phase and the aqueous solution. In further embodiments, an outer electrode (106) is coupled to an outer surface of the nano-pipette (102), which has the aqueous solution (104) disposed therein. Further, an inner electrode (108) may be disposed in the aqueous solution (104) within the nano-pipette (102). In an embodiment, the inner electrode (108) is a wire composed of silver chloride. In another embodiment, the outer electrode (106) is an iridium platinum layer coating the outer surface of the nano-pipette (102).

Consistent with previous embodiments, a potential difference applied between the outer electrode (106) and the inner electrode (108) electrically changes the wetting angle between the organic phase and the aqueous solution. In one embodiment, a source meter (110) is disposed between the inner (108) and outer (106) electrodes for controlling the potential difference between said electrodes. The potential difference is a positive bias applied from the source meter (110) between the outer electrode (106) and the inner electrode (108).

The change in the wetting angle effectively stimulates the movement of the aqueous solution (104). Specifically, when the potential difference exceeds a threshold voltage the aqueous solution (104) is extracted and drawn into the nano-pipette (102), whereas when the potential difference is lower than the threshold voltage the aqueous solution (104) is injected and drawn out of the nano-pipette (102). Further, the volume of the aqueous solution (104) extracted or injected is dependent on the magnitude of the potential difference applied. In some embodiments, the volume of the aqueous solution (104) has a range of 1 femto-liter to tens of femto-liters.

In exemplary embodiments, the aqueous solution (104) is a DNA vector extracted from or injected into the nucleus or cytoplasm of a living cell.

Details of the Integrated Electrowetting Nano-Injector

In the present invention, a new simple transfection method using an integrated electrowetting nano-injector ("INENI") with controlled dosage delivery and high transfection efficiency is disclosed. INENIs were fabricated by coating a layer of iridium/platinum ("Ir/Pt") on the outside of a drawn capillary and inserting a silver chloride ("AgCl") electrode inside the drawn pipette containing 1,2-dichloroethane ("1,2-DCE"). The INENIs were calibrated for a femtoliter volume of solution with respect to applied voltages. This calibration data was compared to the proposed theory of the present invention. Following calibration, the INENIs were used to deliver femtoliter volumes of macromolecules such as plasmids inside single cells. Lastly, the transfection efficiency of plasmid injection was verified.

Results

Figure 1B:
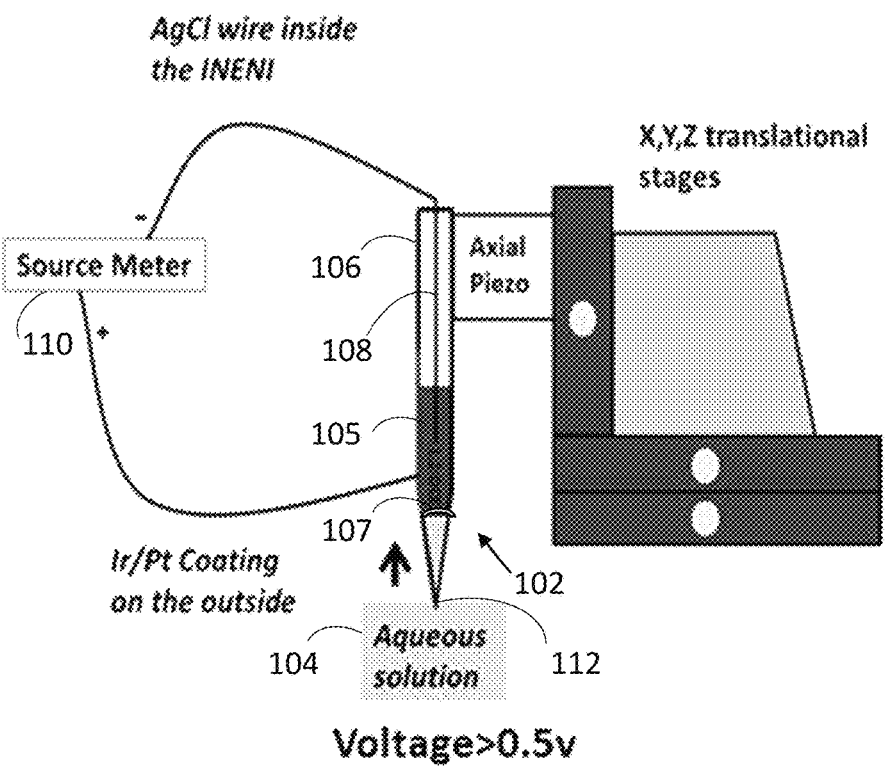
FIG. 1B shows a diagrammatic representation of the INENI for pick up, where voltages higher than 0.5V produce an upward movement of the aqueous solution.
Figure 1C:
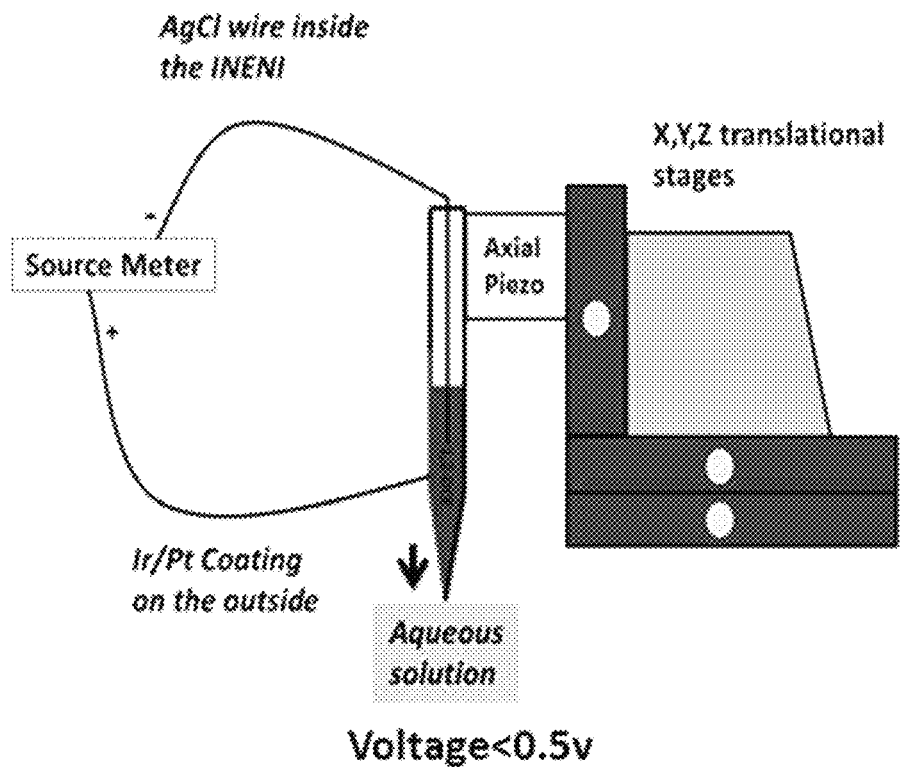
FIG. 1C shows a diagrammatic representation of the INENI for ejection, where voltages lower than 0.5V induce an ejection of the aqueous solution.
Figure 1D:
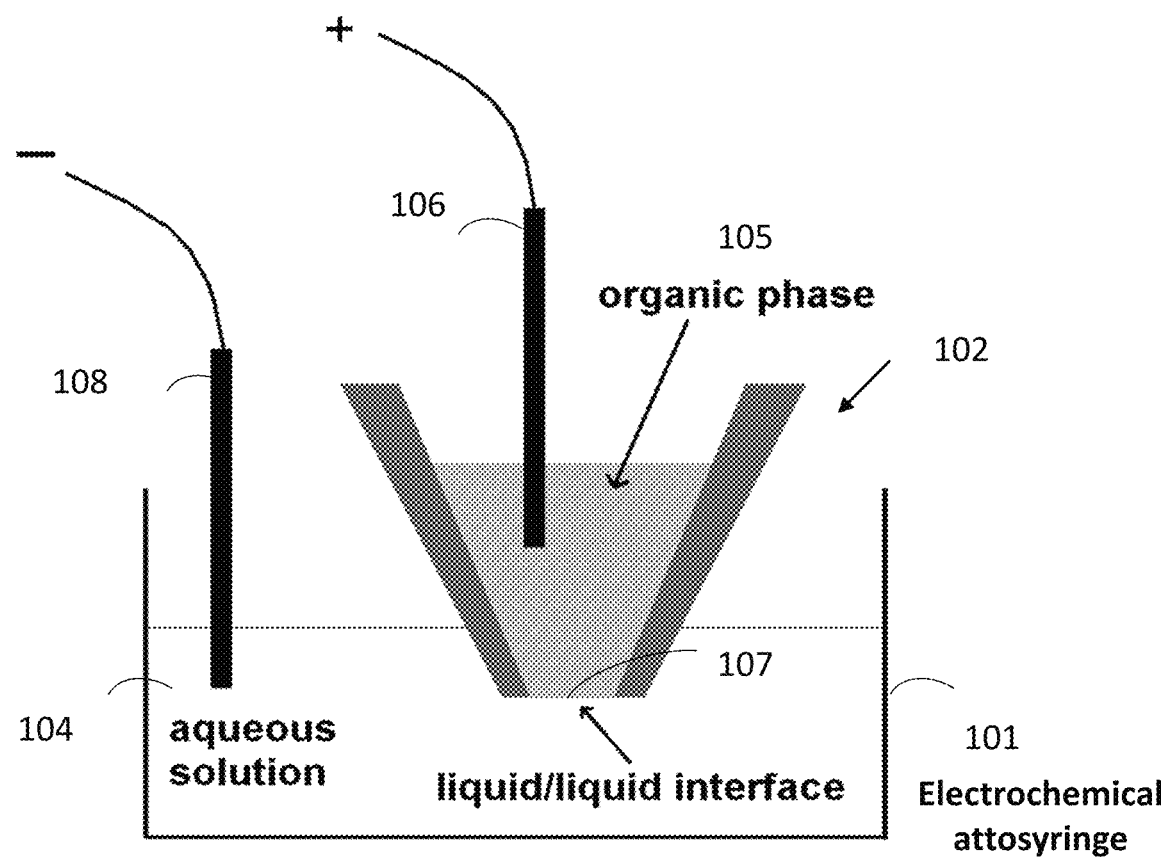
FIG. 1D shows a diagrammatic representation of a cellular injection used in a prior art.
Figure 2B:
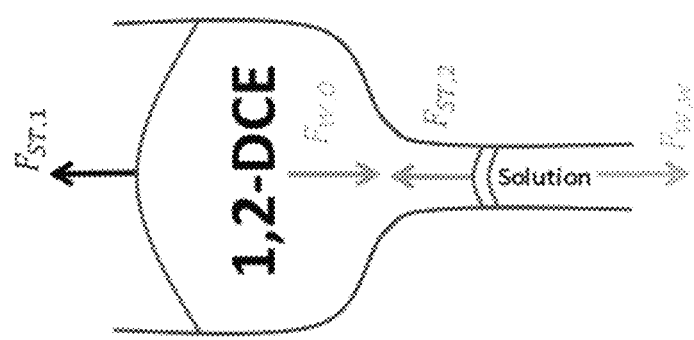
FIG. 2B shows an image of PBS/1,2-DCE meniscus for different applied voltages.
Figure 2A:
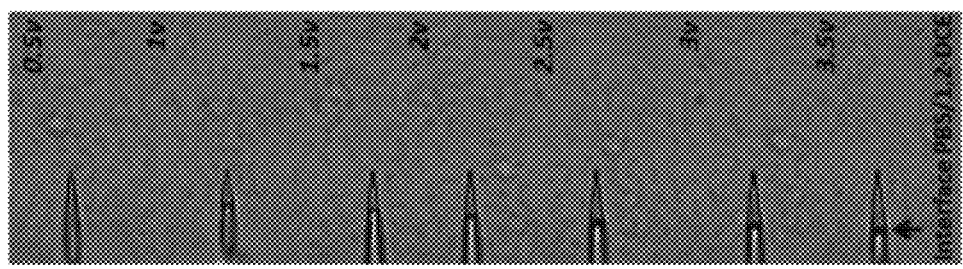
FIG. 2A shows a diagrammatic representation of governing forces in the INENI.
Figure 2C:
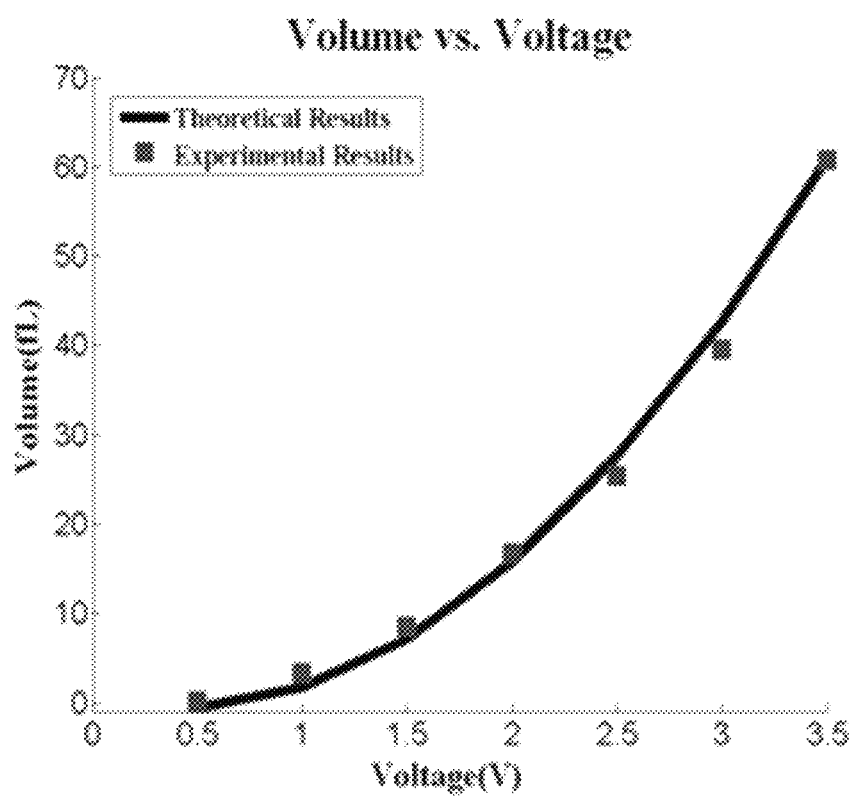
FIG. 2C shows a comparison of theoretically predicted ejected volumes with experimental data.

The capillaries were drawn and coated with a 30 nm layer of Ir/Pt. The INENI openings were roughly 139 nm±3.5 nm compared to commercial microinjection tips (0.5-5 µm) (FIGS. 1A-1C). With positive bias applied on the outer Ir/Pt coating layer and a silver wire electrode inside 1,2-DCE, small volumes can be injected or picked-up from a single cell depending on the magnitude of the voltages applied. To experimentally quantify the fluid volume uptake with respect to applied potential difference, different voltages were applied and the corresponding increase in fluid height within the INENIs were measured using a known distance as a reference with ImageJ software. The radius corresponding to the height of the fluid was calculated based on the angle of the cone. The cone angle from scanning electron microscope ("SEM") images was measured to be 4.3 degrees and the average radius was 70.2 nm. Higher applied voltages were related to increased fluid uptake as noted in FIGS. 2A-2C.

With sufficiently high voltage, a force is generated to move the aqueous solution inside the INENI. There is a force due to surface tension acting on the organic phase, which is constant. This force is dependent on the wetting angle of the organic phase with glass, and the surface tension between the vapor/organic phase. The weight of the organic phase and the aqueous solution are the two other forces (FIG. 2A) that must be considered for the INENI force balance equation (used to balance forces acting on the liquid column inside the INENI). While the weight of organic phase is constant, the weight of aqueous solution will depend on how much liquid remains inside the INENI. Lastly, there is a force due to surface tension acting on the aqueous solution. A double layer forms between the two immiscible solutions of 1,2-DCE and electrolyte. In this study, the capacitor for the double layer was considered constant and the capacitor at the point of zero charge was used in the force balance equation.

The theory (solid line in the graph in FIG. 2C) matches closely with the experimental data (square markers in FIG. 2C) where voltages exceeding 0.5 V result in increased solution uptake in the INENI and voltages less than 0.5 V result in solution being expelled from the INENI. One advantages of the INENI is the ability to accurately control the dosage delivery via applied voltages.

Figure 3B:
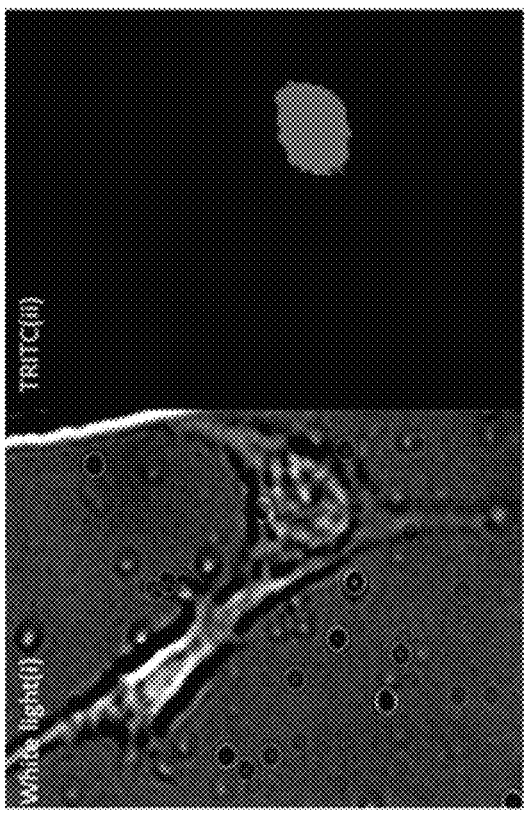
FIG. 3B shows the injection of TRITC into the nucleus of a cell. The image on the left shows an optical image of the cell. The image on the right shows the fluorescent image of the cell.
Figure 3A:
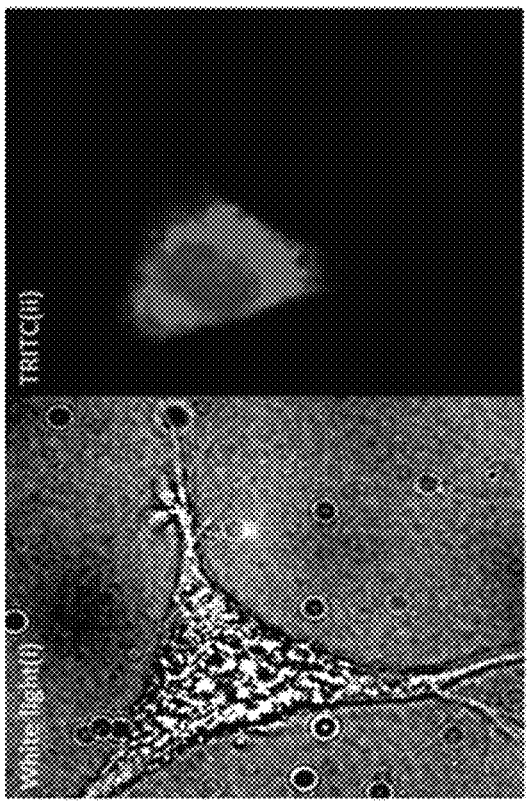
FIG. 3A shows the injection of tetramethylrhodamine isothiocyanate-dextran ("TRITC") into the cytoplasm of a cell. The image on the left shows an optical image of the cell. The image on the right shows the fluorescent image of the cell.

The INENIs were used to inject 50-70 femto-liters of tetramethylrhodamine isothiocyanate-dextran into the cytoplasm as well as the nuclei of mouse NIH 3t3 cells. Dextran molecules are hydrophilic polysaccharides that are conjugated to a dye so that the dye does not escape the membrane of nucleus or cell. The INENI was inside the cell for 10 seconds during injection. After injection, cells were imaged using a fluorescence microscope with Tetramethyl Rhodamine IsoThiocyanate (TRITC) filter (FIGS. 3A-3B). The INENI was used to preferentially inject this macromolecule dye inside the nucleus or the cytoplasm. By placing the INENI on the targeted region (nucleus or cytoplasm), the technique can be used to elicit spatial localization at the point of injection. The dye solution was collected from a separate container and was injected into each cell. The large molecular weight of dextran allowed dye molecules to stay localized and not escape the cell membrane or the nuclear membrane.

Cell viability experiments were not performed after injection of this dye. The injection of the dye into nucleus or cytoplasm was solely performed to prove that this technique can be used to inject and localize molecules in different compartments of a cell. It is not known whether the dextran conjugated dye at the concentration used had long term toxic effects on cells.

Figure 4:
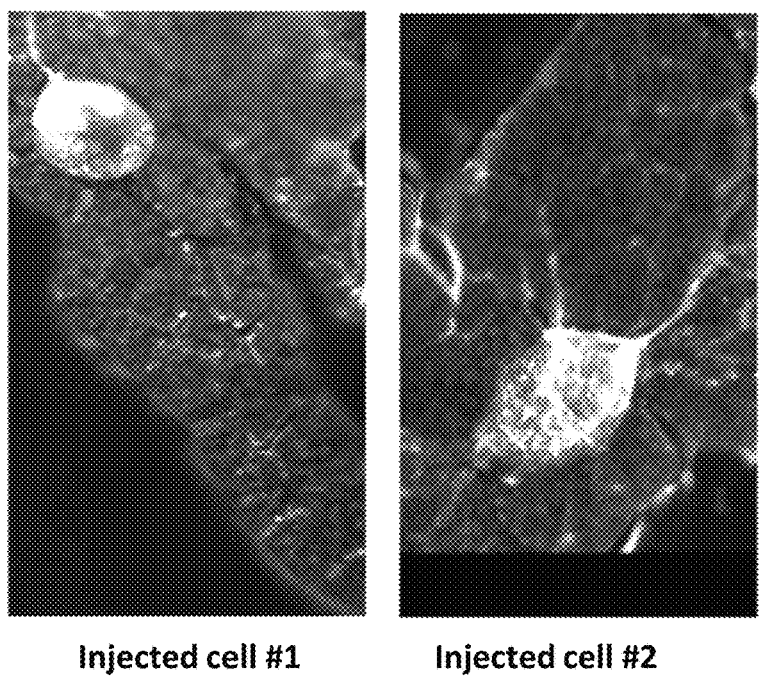
FIG. 4 shows the injection of DNA tagged Fluorescein amidite ("FAM") into two representative fat body cells.

Additionally, the technique was used to inject 10 µM DNA tagged Fluorescein amidite ("FAM") into several fat body cells, cell number 1 and cell number 2 are shown in FIG. 4. Since DNA is negatively charged, with no injection, DNA tagged FAM did not get into cells.

FIGS. 5A-5D shows the capability of INENIs in single cell studies, an estimated 1,800 molecules of 3.5 kb plasmid were injected with an INENI inside NIH 3T3 cells and 48 hours after injection cells expressed green fluorescent protein ("GFP").

Figure 5A:
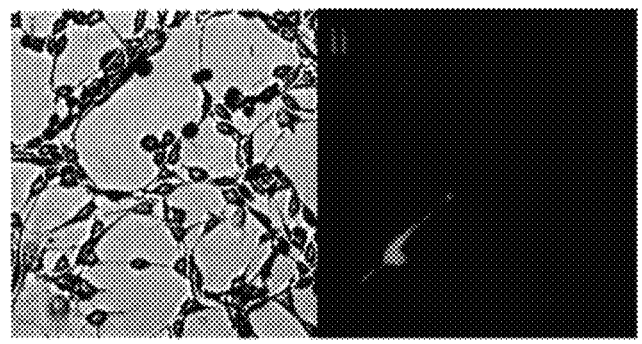
FIG. 5A shows a bright field image of a cell at a lower (10×) magnification (left image) and a cell fluorescence image using a Fluorescein Isothiocyanate ("FITC") filter (right image).
Figure 5B:
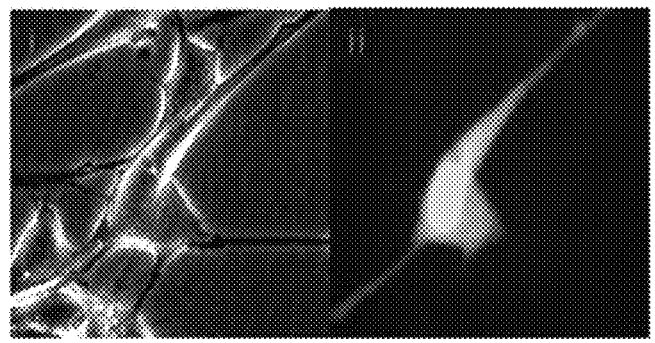
FIG. 5B shows a bright field image, of the same cell shown in FIG. 5A, under 40× magnification (left image) and a cell fluorescence image using an FITC filter under 40× magnification (right image).
Figure 5C:
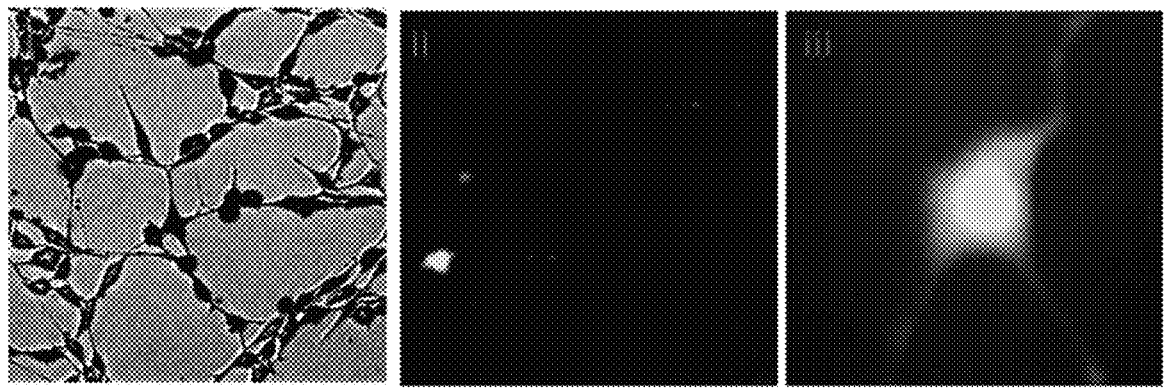
FIG. 5C shows a bright field image of the cell at 10× magnification (left image), the cell using an FITC filter at 10× magnification (middle image), and the cell using an FITC filter at 40× magnification.
Figure 5D:
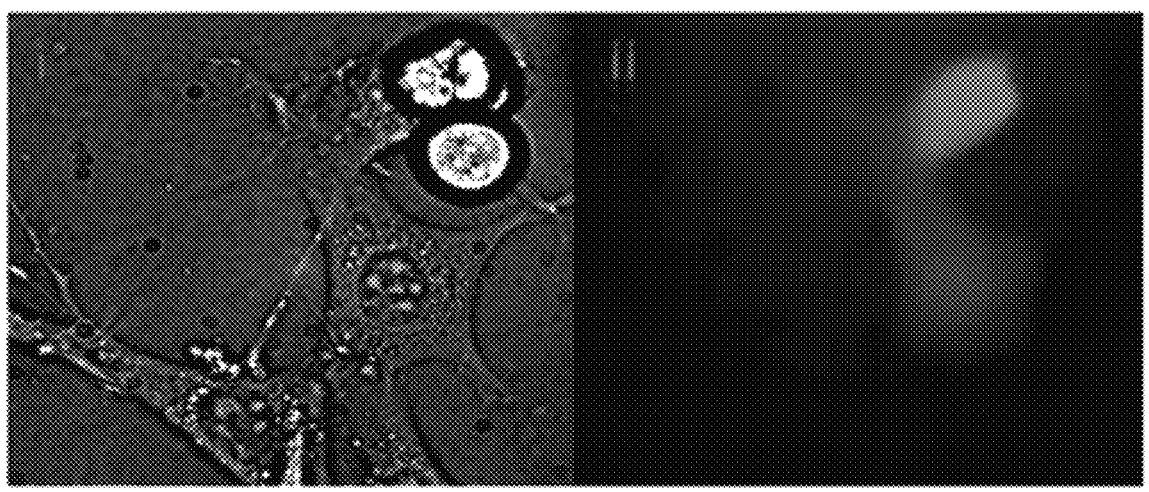
FIG. 5D shows a bright field image of a daughter cell expressing green fluorescent protein ("GFP") 48 hours after transfection (left image) and the same cell using an FITC filter (right image).

Published works on microinjection indicate that 1,000 molecules of injected plasmid resulted in a faint fluorescent signal, whereas 100,000 molecules resulted in bright fluorescence. Below 1,000 molecules, cells were rarely transfected using microinjection. The same INENI could be used for injection of up to six cells. To have a high throughput within the hour, collection and ejection of plasmid happened inside the chamber where cells resided. Plasmid was combined with Dulbecco's Modified Eagle Medium ("DMEM") solutions inside a small polydimethylsiloxane ("PDMS") chamber and INENIs were not withdrawn from the aqueous solution each time for pick up. PDMS chambers were designed to minimize the amount of plasmid needed for injection. To maintain cell viability, cells were kept outside of the incubator for no more than one hour. The transfection efficiency of the technique was evaluated to be close to 100%. In a series of two experiments, twelve cells were injected with plasmid and, after 48 hours, 13 cells were fluorescing indicating GFP expression not only in the injected cells, but also in daughter cells (FIG. 5D). Within an hour, up to 15 cells could be injected. A negative control was performed, where cells residing in the chamber were exposed for one hour to the same concentration of plasmid without any injection. No GFP expression was observed 48 hours after the experiment.

Higher throughput can be achieved by automating the present system. By combining the INENI with vision system and registering the INENI and cells with respect to a reference coordinate in the image plane, the movement time of the injector from cell to cell can be reduced to one or two seconds. The transfection time from cell to cell is primarily limited by fluid ejection time (10 seconds) rather than movement of INENI from cell to cell.

Methods

Fabrication of INENIs.

INENIs were fabricated from borosilicate glass capillaries (Sutter Instrument, Novato, Calif.) using a P-97 puller (Sutter Instrument, Novato, Calif.).

INENIs were sputter coated with a 10 nm layer of iridium followed by a 20 nm layer of platinum on one side. The nano-injectors were oxygen plasma treated at a power of 100 watts for 6 minutes before the experiment. Nano-injectors were filled with a solution of 1,2-DCE containing 10 millimeters of tetrahexyl ammonium bromide. A silver wire coated with AgCl was then inserted into the barrel of the nano-injector.

Injection Set Up.

The injection set-up comprised X, Y, and Z translational micrometer stages for coarse movement (Newport, M-433 for Z movement and M-TSX-1D for X and Y movements) and a nanocube piezo actuator (Physik Instrument, P-280) for finer axial motions of the INENI. These stages were placed on an IX71 Olympus microscope via adaptors that were 3D printed. For current measurement and voltage application, a 2116 Keithly Sourcemeter was employed. For pulsing purposes, an Agilent function generator was used (Model number 33220A), and fluorescent image acquisition employed a SBIG camera (Model number ST-7xMEI). The system was operated using custom coded software written in Labview (National Instruments). The volume of liquid entry was measured via the height of the aqueous solution using ImageJ software and a transmission electron microscopy ("TEM") reference grid.

Cell Culture.

NIH3T3 mouse fibroblasts were cultured with high glucose DMEM media supplemented with 10% fetal bovine serum (ThermoFisher Scientific). All cells were cultured in 5% $CO_2$ at 37° C. and washed with 1× phosphate buffered saline ("PBS"). PDMS chambers were made by a 10:1 w/w base prepolymer curing agent formulation. PDMS was cut into small pieces and square holes of 1 mm by 1 mm by 1 mm were created in each PDMS chamber. PDMS chambers were cleaned with 70% ethanol, dried and placed on top of sterile petri dishes (Sigma Aldrich). A gridded petri dish (polymer coated, Ibidi, Germany) was used for tracking cells. Cells at 60-70% confluency were used in experiments.

Wild type Fruit flies were purchased and were dissected to isolate fat body cells. Adipocyte tissues were attached to coverslips that were coated overnight with Poly-L-lysine (Sigma-Aldrich). Cells were used immediately after dissection.

Dye Preparation.

Tetramethylrhodamine isothiocyanate-dextran was acquired. The final concentration of the dye injected was 8-10 mg/m L.

DNA tagged fluorescein acquired and diluted to 10 μM in Schneider's *drosophila* medium. After the injection, DNA tagged FAM was removed and the cells were washed 3 times with PBS and were imaged with the fluorescent camera.

Plasmid Preparation.

PmaxGFP plasmid was acquired. The final concentration of plasmid was 0.12 μg/μL. The plasmid was diluted in DMEM and placed in a PDMS chamber for further experiments. After the experiment, cells were covered with 10% FBS, 90% DMEM, and 1% antibiotic-antimycotic.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A system configured to use an integrated electrowetting to stimulate an injection or an aspiration of a biomaterial, wherein the biomaterial is an aqueous solution comprising an organic phase and an aqueous phase, the system comprising a single probe which comprises:
    (a) a nano-pipette having an aperture with dimensions in the nanoscale region, wherein an organic phase is disposed in the nano-pipette;
    (b) an outer electrode coupled to and directly attached on an outer surface of the nano-pipette;
    (c) an inner electrode disposed in the organic phase within the nano-pipet,
wherein a potential difference is applied between the outer electrode and the inner electrode to electrically change a wetting angle at an interface between the organic phase and the aqueous solution, said change effectively stimulating the movement of the aqueous solution,
wherein when the potential difference exceeds a threshold voltage, the aqueous solution is extracted and drawn into the nano-pipette, and
wherein When the potential difference is lower than the threshold voltage, the aqueous solution is injected and drawn out of the nano-pipette.

2. The system of claim 1, wherein a source meter is disposed between the inner and outer electrodes for controlling the potential difference between said electrodes.

3. The system of claim 1, wherein a volume of the aqueous solution has a range of 1 femto-liter to tens of femto-liters.

4. The system of claim 3, wherein the volume of the aqueous solution extracted or injected is dependent on a magnitude of the potential difference applied.

5. The system of claim 1, wherein the aqueous solutionis extracted from or injected into a nucleus or a cytoplasm of a living cell.

6. The system of claim 5, wherein the aqueous solution is a DNA vector extracted from or injected into the nucleus of the living cell.

7. The system of claim 6, wherein the DNA vector is extracted from or injected into a cytoplasm of the living cell.

8. The system of claim 1, wherein the inner electrode is a wire composed of silver chloride with a dimension in the order of 0.2 mm.

9. The system of claim 1, wherein the outer electrode comprises an iridium/ platinum layer for coating an outer surface of the nano-pipette.

10. The system of claim 1, wherein the potential difference is a positive bias applied from the source meter between the outer electrode and the inner electrode.

\* \* \* \* \*